United States Patent
Clark et al.

(10) Patent No.: US 7,926,843 B2
(45) Date of Patent: Apr. 19, 2011

(54) EXTERNAL FILTER FOR CUSHION DAMAGE PREVENTION

(75) Inventors: Marcus T. Clark, Kaysville, UT (US); Nyle K. Longhurst, Layton, UT (US); Steven L. Olsen, Ogden, UT (US); Patti Quinney, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 43 days.

(21) Appl. No.: 12/148,061

(22) Filed: Apr. 16, 2008

(65) Prior Publication Data

US 2009/0261562 A1    Oct. 22, 2009

(51) Int. Cl.
*B60R 21/16* (2006.01)

(52) U.S. Cl. .................. 280/740; 280/741

(58) Field of Classification Search .......... 280/736, 280/740, 741
See application file for complete search history.

(56) References Cited

U.S. PATENT DOCUMENTS

| | | | |
|---|---|---|---|
| 5,028,070 A | | 7/1991 | Bender |
| 5,087,070 A | * | 2/1992 | O'Loughlin et al. ......... 280/740 |
| 5,443,286 A | * | 8/1995 | Cunningham et al. ........ 280/741 |
| 5,551,724 A | | 9/1996 | Armstrong, III et al. |
| 5,611,566 A | * | 3/1997 | Simon et al. .................. 280/736 |
| 5,665,131 A | * | 9/1997 | Hock et al. ...................... 55/487 |
| 5,730,462 A | * | 3/1998 | Jackson et al. ................ 280/741 |
| 5,763,820 A | | 6/1998 | Philpot et al. |
| 5,806,888 A | * | 9/1998 | Adamini ........................ 280/741 |
| 5,816,612 A | | 10/1998 | Faigle et al. |
| 5,829,785 A | | 11/1998 | Jordan et al. |
| 5,845,934 A | * | 12/1998 | Armstrong, III ............. 280/742 |
| 6,065,774 A | | 5/2000 | Cabrera |
| 6,123,359 A | | 9/2000 | Cabrera et al. |
| 6,250,673 B1 | * | 6/2001 | Unterforsthuber et al. ... 280/741 |
| 6,886,855 B2 | * | 5/2005 | Cheal et al. .................... 280/741 |
| 7,063,350 B2 | | 6/2006 | Steimke et al. |
| 7,267,365 B2 | | 9/2007 | Quioc |
| 7,404,574 B2 | * | 7/2008 | Hirooka et al. ............... 280/741 |

FOREIGN PATENT DOCUMENTS

JP    05213147 A  *  8/1993

* cited by examiner

*Primary Examiner* — Faye M. Fleming
(74) *Attorney, Agent, or Firm* — Sally J. Brown; Madson IP, P.C.

(57) ABSTRACT

An inflator includes a generant chamber that houses a quantity of gas generant. The chamber has a plurality of gas exit holes that are positioned along the length of the generant chamber. A filter is added exterior of the chamber. In fact, the filter may be positioned on the exterior of the generant chamber. Straps may encircle the inflator. The straps are attached to studs that will operate to mount the inflator. The position of the straps may be adjusted and tailored to apportion the amount of inflation gas that is directed into each chamber of a multi-chambered or two-chambered airbag.

18 Claims, 5 Drawing Sheets

EXTERNAL FILTER FOR CUSHION DAMAGE PREVENTION

BACKGROUND OF THE INVENTION

Airbag and airbag technology have been known and used for decades. These airbag systems are designed such that in the event of an accident or crash, the airbag will inflate and become positioned on the interior of the vehicle. Such positioning of the airbag will prevent the vehicle occupant from harmfully impacting the windshield, steering wheel, dashboard, vehicle door, or other portions of the vehicle interior. Airbags have been credited with saving thousands of lives and are now standard on new motor vehicles.

In order to inflate and deploy the airbag during a crash, an inflator is used. The inflator produces and/or channels a large quantity of inflation gas into the airbag, thereby inflating the airbag and causing the airbag to become positioned in the vehicle interior. One type of inflator that is commonly used is the so-called "pyrotechnic" inflator. This type of inflator includes a gas generant that will be ignited during an accident or crash. Such ignition of the gas generant readily produces a large quantity of inflation gas that is then channeled into the inflator and used to deploy the airbag.

Pyrotechnic inflators generally include a filter that operates to filter the gas prior to having the gas exit the inflator and enter the airbag. However, positioning the filter within the inflator can be difficult and expensive. Also, the filter operates to cool the gas so that the inflator does not "flash." Likewise, the quantity of inflation gas produced by a pyrotechnic inflator will contact the airbag at a high rate of speed, which puts stress on the airbag material (and may damage the airbag). It may be desirable to find a way to reduce this force that the inflation gas applies to the airbag. This would prevent damage to the airbag. Such a device is disclosed herein.

BRIEF SUMMARY OF THE INVENTION

The present embodiments relate to a pyrotechnic airbag inflator. The inflator includes a quantity of gas generant (which is sometimes referred to as "generant"). This generant is housed within a generant chamber. The generant may be ignited during an accident or crash to produce a quantity of inflation gas. This inflation gas may then be used to inflate and deploy an airbag. The chamber includes one or more gas exit holes that are substantially distributed along the length of the chamber. The gas exit holes are designed such that when the gas in produced by ignition of the generant, the gas will exit the chamber via the gas exit holes.

A filter is used with the inflator. The filter is designed to filter the gas prior to having the gas enter the airbag. The filter may be made of metal or other similar materials. The filter may be a two-layer filter in that it comprises an inner layer and an outer layer. The filter is positioned outside of the generant chamber. In fact, the filter may be positioned on the exterior of the inflator. During deployment, the gas exits the chamber and then is filtered, blocked and/or diffused by the inner layer and the outer layer of the filter. Such blocking/diffusion of the gas outside of the chamber reduces the force at which the gas contacts the airbag and makes the influx of the gas into the cushion much less aggressive.

In some embodiments, a porous screen and a foil may be positioned within the generant chamber. The porous screen prevents the gas generant from blocking one or more of the gas exit holes.

One or more barriers may also be added to the inflator. The barriers redirect the gas as it exits the chamber through the gas exit holes. In some embodiments, the barriers are foil strips positioned on the outer surface of the generant chamber, wherein the foil strips are positioned between the filter and the gas exit holes. In other embodiments, the barriers are solid portions of the filter's inner layer.

A fastener may also be added. The fastener is used for attaching the inflator to a vehicle. The position of the fastener (s) may be selected to apportion the amount of inflation gas that is directed into each chamber of an airbag having a plurality of chambers. The fasteners may comprise a strap that is attached to a stud, the strap encircling the filter, the strap being staked against the filter. Other embodiments are designed such that there are two straps positioned along the length of the filter, wherein the relative positions of the straps are selected to apportion the amount of inflation gas that is directed into each chamber of a two-chambered airbag.

In other embodiments, the filter may include one or more solid portions. These solid portions may be part of the inner layer. These solid portions are impenetrable to the flow of gas. The solid portions may be barrier plates, foil strips, or other impenetrable surfaces that block the gas flow. In other embodiments in which the filter is metal, the solid portions are simply integral portions of the metal that have not been punctured or pierced to create gas flow holes. (Without these punctures in the metal, the solid metal surface is impenetrable to the gas flow.)

The location of the solid portions in the inner layer corresponds to the location of the gas flow holes in the chamber. Accordingly, when the gas flows through the holes, it may contact or encounter the solid portions and may be blocked by the solid portions. The gas will then be redirected around the solid portions (i.e., flow through other penetrable portions of the inner layer). Once the gas flows through the inner layer, it flows through the outer layer and accesses the interior of the airbag to inflate the airbag. However, by requiring the gas flow to go around the solid portions, additional blocking and diffusing of the gas may occur.

The inflator may be mounted to the vehicle using one or more straps that are attached to studs. The straps surround/encircle the inflator and the studs engage a vehicle surface, thereby mounting the inflator to the vehicle. Multiple straps may be used. Of course, the exact number, position or configuration of the straps may be selected to apportion or tailor the amount of gas that is directed into each particular chamber of a two-chambered (or multi-chambered) airbag.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

The word "exemplary" is used herein to mean "serving as an example, instance, or illustration." Any embodiment described herein as "exemplary" is not necessarily to be construed as preferred or advantageous over other embodiments.

Figure 1:
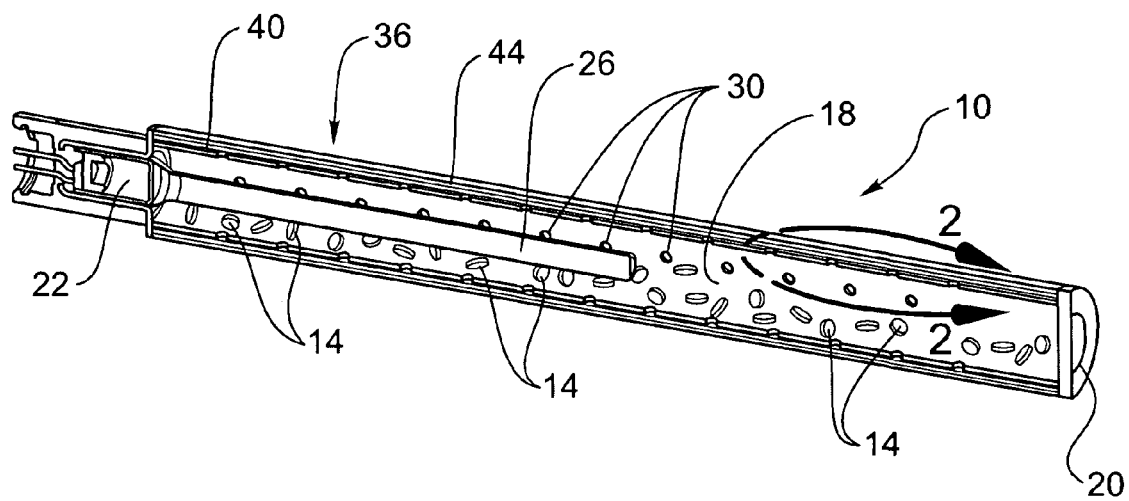
FIG. 1 is a cross-sectional view of an embodiment of an inflator that includes an exterior filter.

Referring now to FIG. 1, a cross-sectional view of an inflator 10 according to the present embodiments is depicted. The inflator 10 may be used to inflate an airbag (not shown in FIG. 1) during an accident or crash. The inflator 10 is a pyrotechnic inflator, and as such, the inflator 10 includes a quantity of gas generant 14 that is housed within a generant chamber 18. In the embodiment shown in FIG. 1, the chamber 18 extends along the entire length of the inflator 10. Of course, other configurations and/or shapes of the chamber 18 are also possible. Further, although pellets are shown, the shape, size, amount, location, and/or configuration of the generant 14 may depend upon the particular embodiment. An end plate 20 may also be added to the distal end of the inflator 10.

The inflator 10 also includes an initiator 22 and a combustion tube 26. The initiator 22 (which may also be referred to as a "squib") is designed to initiate deployment of the inflator 10 in the event of an accident or crash. Specifically, the initiator 22 receives the appropriate signal indicating crash conditions and then sends hot gases, an electrical charge, or other products down the combustion tube 26. These products operate to ignite the generant 14 and convert the generant 14 into a quantity of inflation gas. The inflation gas formed in this process may then be used to deploy the airbag. The type of initiator that can be used depends on the generant that is used and is known the in the art.

The chamber 18 includes one or more gas exit holes 30. The exit holes 30 may, though need not be, equidistant or equally spaced along the length of the chamber 18. (In other words, the distance between each of the holes 30 along the length of the chamber 18 is substantially the same). The gas exit holes 30 are designed such that when the gas is produced by ignition of the generant 14, the gas will exit the chamber 18 via the gas exit holes 30. The gas exits the chamber 18 to be channeled into the airbag.

As shown in FIG. 1, the inflator 10 may also include a filter 36. The filter 36 is designed to filter the gas prior to having the gas enter the airbag. The filter may be made of metal or other suitable materials. The filter 36 may be a two-layer filter in that it comprises an inner layer 40 (which may be referred to as a "first" layer) and an outer layer 44 (which may be referred to as a "second" layer). The filter 36 may be positioned outside of the generant chamber 18. As shown in the embodiment of FIG. 1, the filter 36 may be positioned on the exterior of the inflator 10. Accordingly, the top of the outer layer 44 may be exposed. It should be noted that is some embodiments, the layers will be separate layers. Other embodiments are designed in which the layers are simply different areas or regions of the same integral piece. Further, the filter 36 may be a multi-layered filter wherein the inner layer 40 is not necessarily the innermost layer, but rather is simply a layer that is inward of the outer layer 44. Likewise, the outer layer 44 is not necessarily the outermost layer, but is simply a layer that is outward of the inner layer 40.

Figure 2:
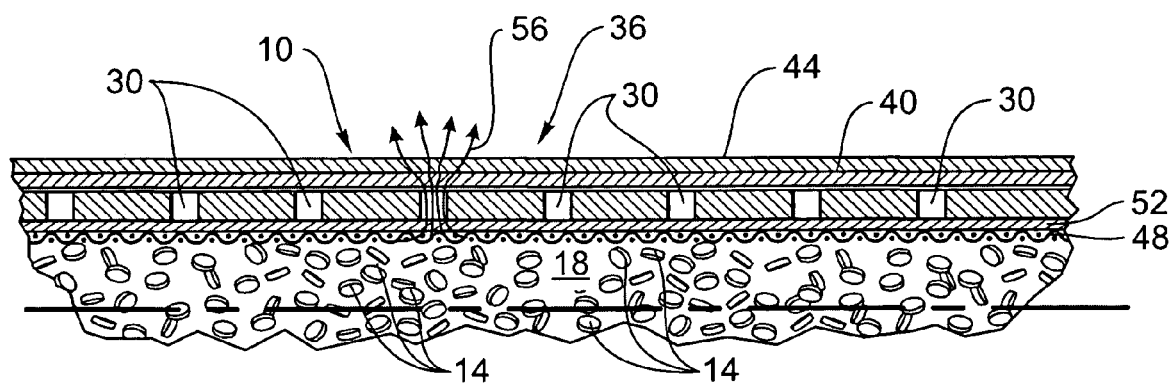
FIG. 2 is an enlarged cutaway cross-sectional view of the embodiment of FIG. 1 taken along the line 2-2.

FIG. 2 is a cross-sectional view of the inflator 10 taken along the line 2-2 of FIG. 1. As can be seen in FIG. 2, the chamber 18 may include a porous screen 48 and a foil strip 52. (For clarity, these features were omitted from FIG. 1). The porous screen 48 is positioned over the generant 14 in order to prevent the generant tablets from blocking or "choking" the holes 30. Further, during deployment, the screen 48 may be able to filter out some of the particulate material from the gas prior to the gas exiting the chamber 18. The foil 52 (which may be a foil strip) operates to initially seal the chamber 18 from moisture intrusion. However, the foil 52 will be ruptured during deployment so that the gas will be allowed to escape out of the chamber 18.

The flow of the gas during deployment is illustrated by arrows 56. Specifically, when the gas is created by ignition of the generant 14, the gas will flow through the porous screen 48 and then through the foil 52 and out of the chamber 18 via the holes 30. The gas will then contact the filter 36 outside of the chamber 18 and will be filtered by both the inner layer 40 and the outer layer 44. Once filtered by both layers 40, 44, the gas may then be directed into the airbag (not shown in FIG. 2).

It should be noted that in the embodiment of FIG. 2, the inflation gas (which is generally a hot gas) exits the chamber 18 through the holes 30 which are positioned along the entire length of the chamber 18. Then the gas is blocked and diffused outside of the chamber 18 by the filter 36. The gas is filtered/diffused before the gas reaches the airbag. Such blocking/diffusion of the gas outside of the chamber 18 reduces the force at which the gas contacts the airbag and makes the influx of the gas into the cushion much gentler and much less aggressive. The filter also may operate to cool the gas to prevent hot gases from damaging the airbag.

Figure 3A:
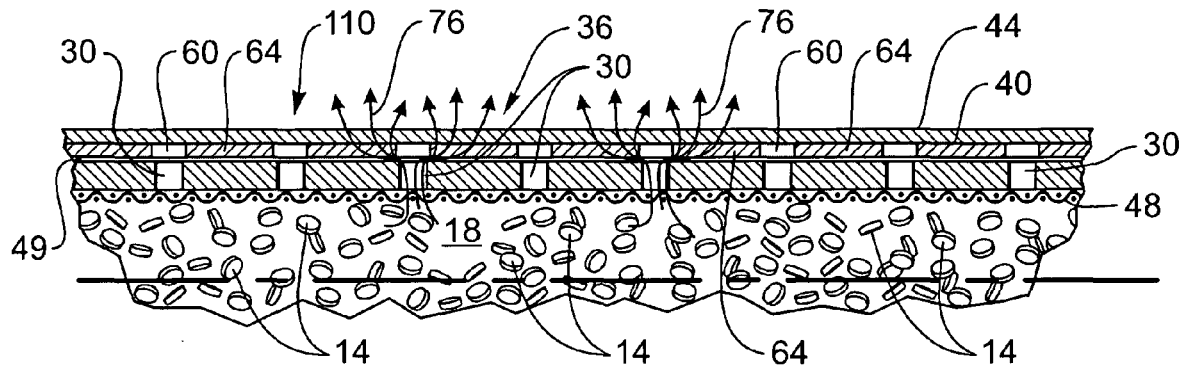
FIG. 3A is an enlarged cutaway cross-sectional view that shows another embodiment of an inflator that includes a filter.
Figure 3B:
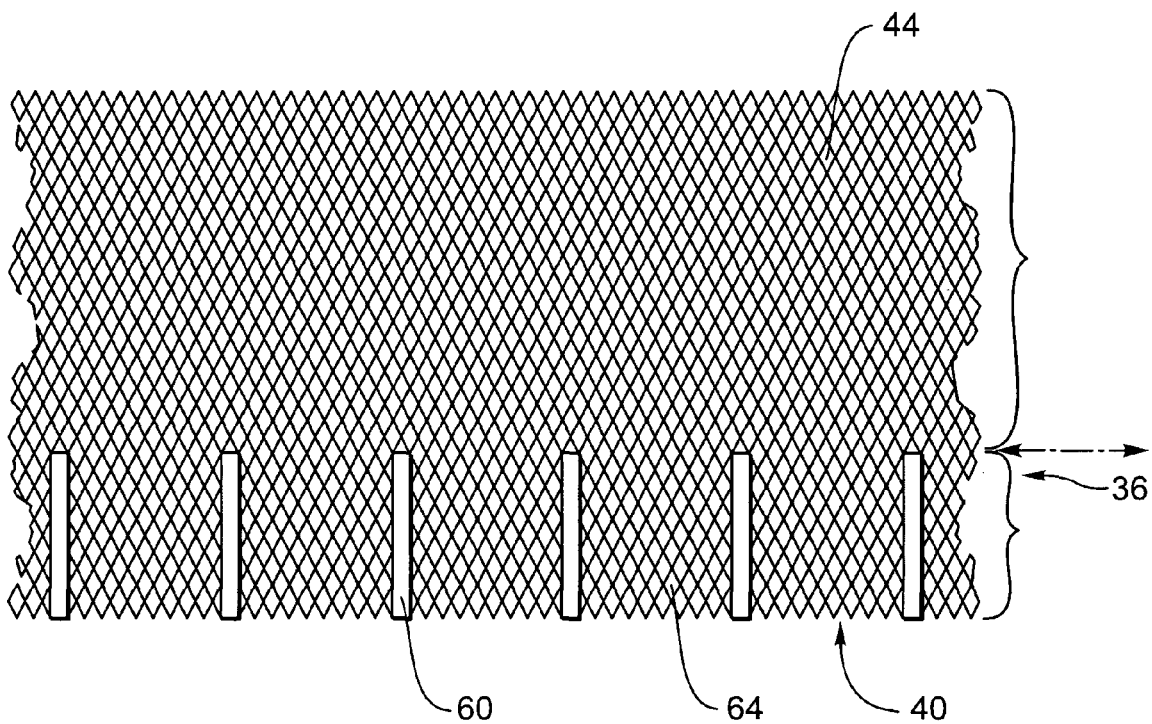
FIG. 3B is a layout, plan view of the filter used in the embodiment shown in FIG. 3A (i.e., the filter has been unrolled to appear flat)

Referring now to FIG. 3A, an additional embodiment is illustrated. FIG. 3A is a cross-sectional view that is similar to the view shown in FIG. 2. However, FIG. 3A shows an embodiment of inflator 110. The inflator 110 is similar to the inflator 10 discussed above. Accordingly, for purposes of brevity, this description will not be repeated. The difference between inflator 10 and inflator 110 involves the filter 36. Specifically, in the inflator 110, the inner layer 40 of the filter 110 includes areas 60 that are impenetrable. These areas are referred to herein as "solid portions" 60. The gas cannot flow through these solid portions 60. FIG. 3B shows an exemplary filter 36 in greater detail. As can be seen in FIG. 3B, the outer layer 44 is an unmodified filter that allows the gas to pass through. However, the solid portions 60 are added to the inner layer 40. The inner layer 40 also includes one or more penetrable portions 64 through which gas may pass. In other words, gas may pass through the penetrable portions 64 of the inner layer 40 but may not pass through the solid portions 60. Of course, there is a space 49 between the inner layer 40 and the openings 30 that will allow gas to flow. In other words, the space 49 prevents the solid portions 60 from completely sealing the holes 30 (and thus preventing gas flow). Rather, the space allows the gas to escape through the holes, yet still encounter/contact the solid portions 60.

Referring now to FIGS. 3A and 3B collectively, the gas flow through the inflator 110 will be described. As shown in FIGS. 3A and 3B, the inflator 110 includes generant 14 that will be ignited into a quantity of inflation gas. This inflation gas may flow through the porous screen 48 (not shown in FIGS. 3A and 3B) and may then flow through ruptured openings in the foil 52. The gas then flows out of the chamber 18 via the holes 30. Again, because the holes 30 are positioned along the length of the chamber 18, the gas may be allowed to flow through all of the holes 30.

As shown in FIG. 3A, the position of the solid portions 60 corresponds to the position of the holes 30. Accordingly, when the gas flows through the holes 30, it will contact or encounter the solid portions 60. In fact, the gas will be blocked by the solid portions 60, and the gas will be forced to go around the solid portions 60 (as illustrated by the arrows 76 in FIG. 3A). The gas goes around the solid portions 60 and then flows through the inner layer 40 via the penetrable portions 64. Once the gas passes through the penetrable portions 64, the gas then flows through the outer layer 44 and may be directed into the airbag (not shown in FIG. 3A).

By requiring the gas to go around the solid portions 60, additional diffusing of the gas is created. This additional diffusing of the gas flow caused by the solid portions 60 further reduces the force at which the gas contacts the airbag and makes the influx of the gas into the cushion much gentler and much less aggressive.

It should be noted that the filter 36 of FIG. 3A may be any type of filter that is known and used for inflators. However, one particular type of filter is an expanded metal filter which comprises a metal piece with perforations added thereto. These perforations may then been "expanded" or stretched to a desired size and shape. In practice, the gas may then flow through these expanded holes. Accordingly, if an expanded metal filter is used, such as in the embodiment of FIG. 3A, the solid portions 60 may simply be formed by not puncturing areas of the metal piece. These un-punctured areas are solid, integral metal that will not allow gas to pass. The other areas of the filter 36, including the penetrable portions 64 and the outer layer 44 are the areas of the expanded metal filter that have been punctured and will allow gas to flow through. In other embodiments, the barriers may be positioned on the outer layer 44. In further embodiments, there may be multiple layers of barriers—i.e., barriers in both the outer and inner layers.

It should also be noted that the holes 30 may be varied in size and quantity in order to allow the correct or desired amount of gas to exit the inflator during depllyment.

Figure 4:
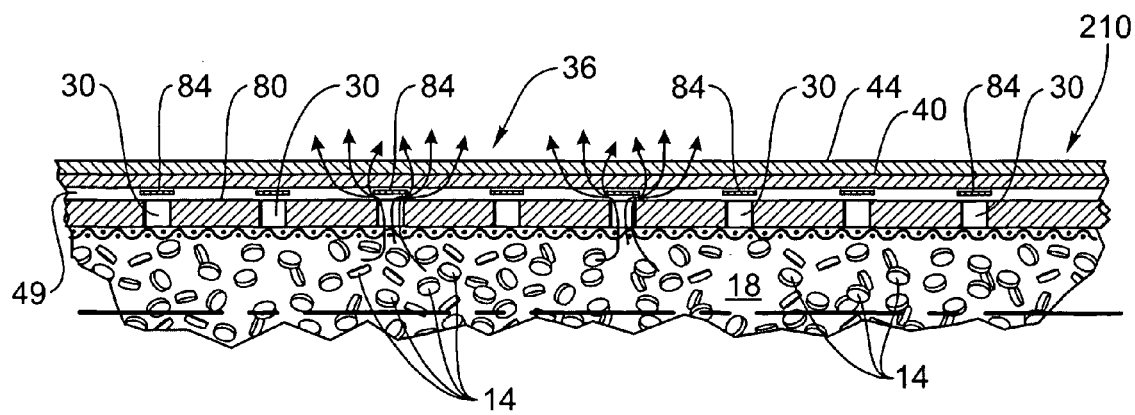
FIG. 4 is an enlarged cutaway, cross-sectional view that shows another embodiment of an inflator that includes a filter.

Referring now to FIG. 4, another embodiment of an inflator 210 is illustrated. The inflator 210 is similar to the inflators discussed above. For purposes of brevity, this description will not be repeated. The difference between the inflator 210 and that which is described above again involves the inner layer 40 of the filter 36. In the embodiment shown in FIG. 4, the inflator 210 has a filter 36 that includes an inner layer 40 and an outer layer 44 that are made of the same material. However, one or more metallic strips 84 are attached to the outside surface 80 of the chamber 18. The metallic strips 84 operate to block the holes 30 prior to deployment to prevent moisture intrusion. Of course, the metallic strips 84 are configured such that when the exiting gas passes through the holes 30, the metallic strips 84 are pushed outwards toward the inner layer 40, thereby giving the gas an escape path (and allowing the gas to pass through the holes 30 and enter the inner layer 40). The metallic strips 84 are moved outward through the space 49. At the same time, the contact between the gas and the metallic strips 84 forces the gas to be re-directed, and thus reduces the force at which the gas contacts the airbag (not shown in FIG. 4) and makes the influx of the gas into the cushion gentler and less aggressive. (Even after the metallic strips 84 have been moved to uncover the holes 30, there still may be contact between all or a portion of the gas and the metallic strips 84, thus operating to fully or partially diffuse the gas). The presence of the metallic strips 84 also operates to cool the gas to reduce the likelihood that hot gases will damage the airbag.

Figure 5:
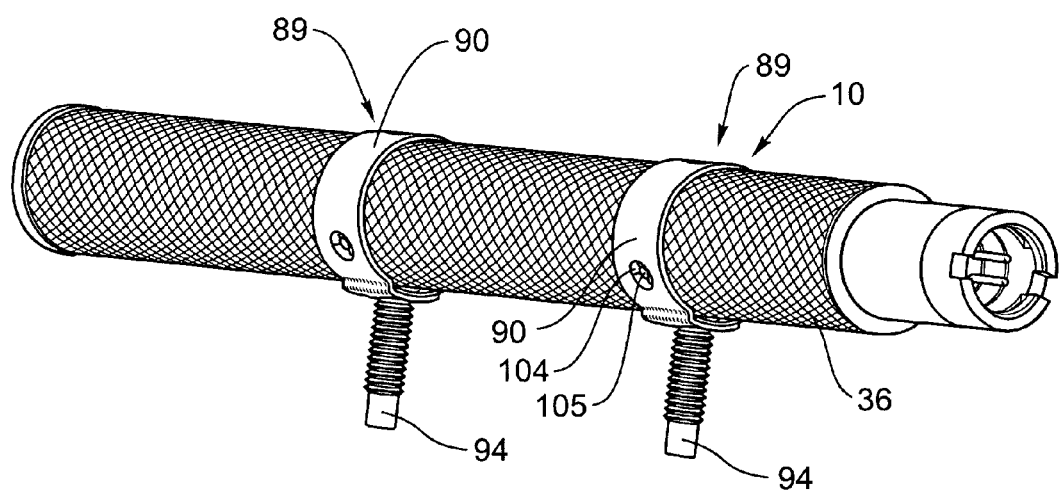
FIG. 5 is a perspective view of the inflator of FIG. 1 that shows a way in which the inflator may be mounted to a vehicle.

Referring now to FIG. 5, further aspects of the present embodiments will now be described. FIG. 5 is a perspective view of the inflator 10 of FIG. 1. However, similar embodiments may be made using the exemplary inflators 110, 210 described herein. FIG. 5 shows the way in which the inflator 10 may be mounted to a vehicle. In order to achieve this mounting, one or more fasteners 89 may be used. The fasteners 89 are any device or feature that is capable of mounting the inflator 10. In some embodiments, the fasteners 89 may be screws, bolts, etc. However, in the embodiment shown in FIG. 5, the fasteners 89 comprise straps 90 and studs 94. The straps 90 encircle the inflator 10 and more specifically, the straps encircle the filter 36. The straps are connected to the studs 94. The studs 94 may operate to mount the inflator 10. Specifically, the studs 94 may be inserted into an opening in the vehicle surface. The studs 94 may also include threads which would allow the studs 94 to screw into a vehicle surface (or an opening in a vehicle surface).

Figure 6A:
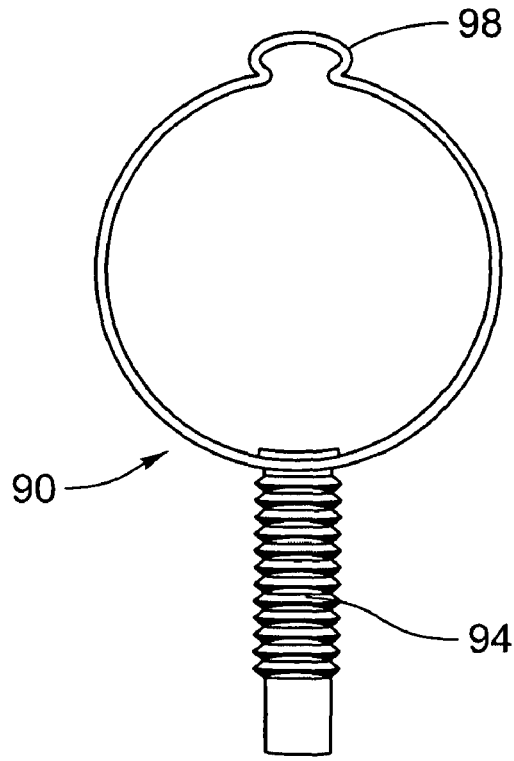
FIGS. 6A and 6B are perspective views of exemplary embodiments of straps that may be used to mount the inflator of FIG. 5 to a vehicle.
Figure 6B:
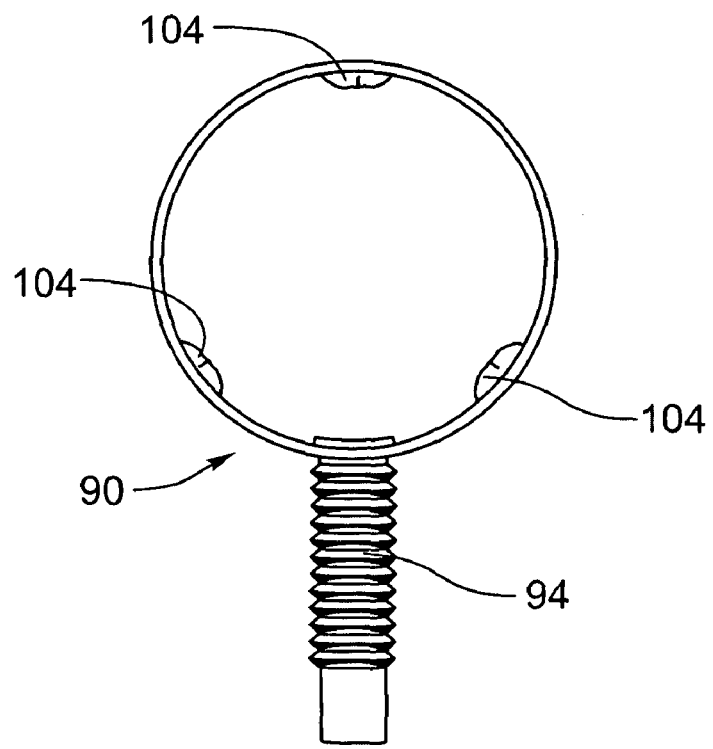

FIGS. 6A and 6B show the straps 90 and the studs 94 in greater detail. As can be seen in these Figures, the studs 94 extend away (for example downwardly away) from the straps 90. The straps 90 may be clamped, using the clamp 98 around the inflator 10. (For clarity, the inflator 10 is not shown in FIGS. 6A and 6B). Additionally (or alternatively), the straps 90 may be staked to the inflator 10 (via staking area 104) once the strap 90 encircles the inflator 10. Such staking operates to hold the straps 90 in place and is designed to ensure that the straps 90 do not become separated from the inflator 10 during installation or operation of the vehicle. (The embodiment shown in FIG. 5 has also been staked with stakes 105.) Staking the straps 90 to the inflator 10 is but one example of the way in which the straps 90 may be held in the proper place. Stapling, gluing, RF welding, or any other means of connecting/securing the straps 90 may also be used.

Figure 7A:
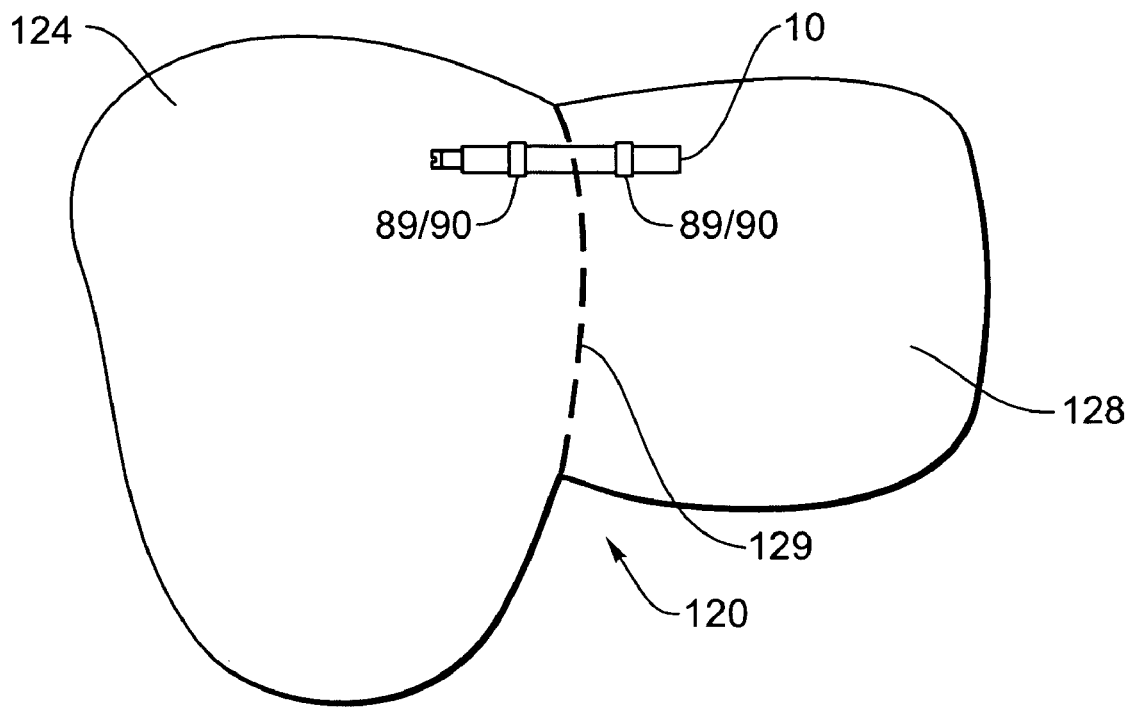
FIGS. 7A and 7B are perspective views that show that way in which the inflator of FIG. 5 may be used in connection with inflating an airbag.
Figure 7B:
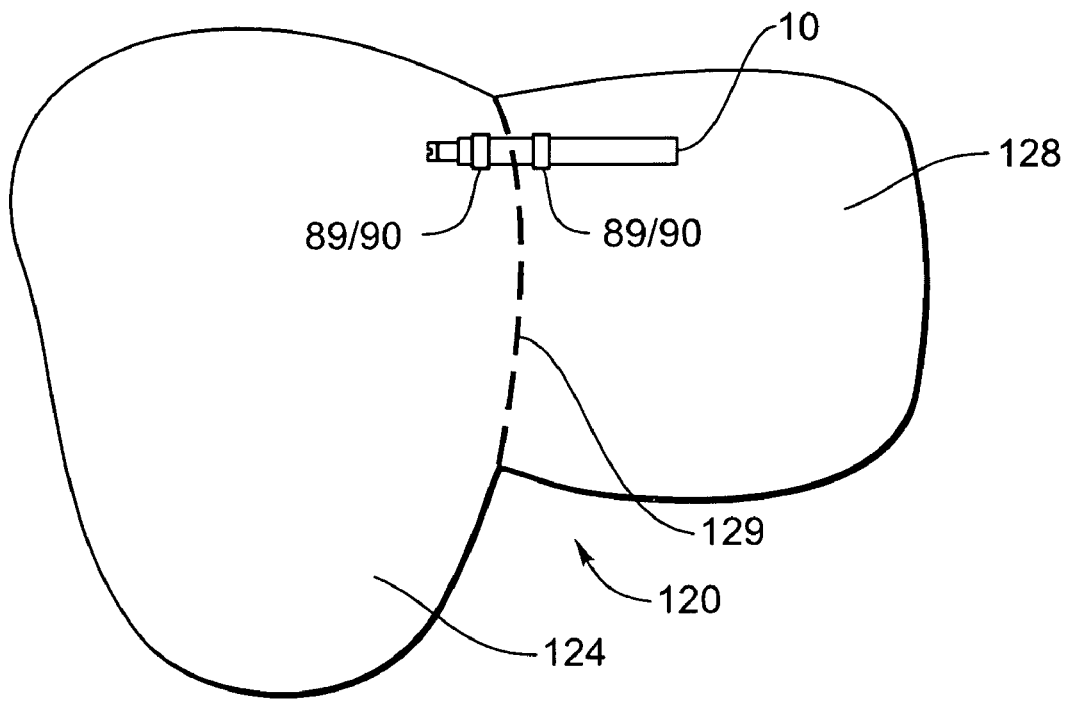

FIGS. 7A and 7B are perspective views that show the inflator 10 of FIG. 5 being used with an airbag 120. (This airbag may also be referred to as a "cushion."). In the embodiment shown in FIGS. 7A and 7B, the airbag 120 is a "two-chambered" airbag, meaning that the airbag 120 has a first chamber 124 and a second chamber 128. In other embodiments, additional chambers may be added to the airbag 120. In other words, additional embodiments may be constructed which involve a "multi-chambered" airbag, not just a two-chambered airbag.

It is to be understood that the position of the fastener(s) 89/strap(s) 90 may affect the amount of inflation gas that is directed into each particular chamber of a two-chambered (or multi-chambered) airbag 120. For example, by positioning the fasteners 89/straps 90 at locations along the length of the inflator 10, the gas exiting the inflator 10 may be directed into certain areas of the two-chambered airbag 120. In other words, the relative position of the fasteners 89/straps 90 may be tailored and selected to apportion the amount of inflation gas that is directed into each chamber 124, 128 of the two-chambered airbag 120. As shown in FIG. 7A, two straps 90 are generally equally spaced apart relative to the ends of the inflator 10. Such positioning of the straps 90 produces a 50/50 split (or substantially a 50/50 split) of the gas flow between the chambers 124, 128. Accordingly, in this configuration, deployment of the inflator 10 will result in about one-half of the inflation gas being directed into the first chamber 124 and about one-half of the gas being directed into the second chamber 128. With respect to FIG. 7B, the two straps 90 are still positioned approximately the same distance apart. However, in this embodiment, one of the straps 90 is positioned proximate the edge of the inflator 10. In this configuration, deployment of the inflator 10 will result in, for example, a 30/70 split (or substantially a 30/70 split) of the gas flow. This means that about 30% of the gas will be directed into the first chamber 124 and about 70% of the gas will be directed into the second chamber 128.

Of course, the exact depictions given in FIGS. 7A and 7B are provided for illustrative purposes only. Those skilled in the art will appreciate that the position of the fastener(s) 89/strap(s) 90 may be adjusted, as desired, to modify or apportion the flow of gas into the various chambers of a multi-chambered airbag 120. Likewise, in the embodiments in which multiple fasteners 89/straps 90 are used, the distance between the fasteners 89/straps 90 may be modified/adjusted to further apportion/tailor the amount of gas flowing into each chamber. Further, the location and position of the fasteners 89/straps 90 may be modified/adjusted relative to the divider 129 between the chambers 124, 128. By modifying the number of the straps 90, the position of the straps 90, and/or the distance between the straps 90 (or fasteners 89), any specific distribution or apportionment of gas between the chambers may be achieved. Those skilled in the art would appreciate that these principles apply equally to multi-chambered airbags that have three, four, five, etc. chambers. Any particular apportionment of the gas into each of the chambers may be had by modifying the position of straps, the number of straps, and/or the distance between straps, etc. Of course, this may involve routine testing and/or "trial and error" to obtain the desired apportionment. Such trial and error testing is well known and within the knowledge possessed by those skilled in the art.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator comprising:
  a generant chamber housing a quantity of gas generant;
  a plurality of gas exit holes in the generant chamber, the gas exit holes being positioned along the length of the chamber; and
  a filter positioned outside of the generant chamber; and
  one or more barriers that redirect the gas as it exits the chamber through the gas exit holes.

2. An inflator as in claim 1 wherein the filter is positioned on the exterior of the inflator.

3. An inflator as in claim 1 further comprising a porous screen and foil positioned within the generant chamber, wherein the porous screen prevents the gas generant from blocking one or more of the gas exit holes.

4. An inflator as in claim 1 wherein the filter comprises an inner layer and an outer layer.

5. An inflator as in claim 1 wherein the barriers comprise foil strips positioned on the outer surface of the generant chamber, wherein the foil strips are positioned between the filter and the gas exit holes.

6. An inflator as in claim 1 wherein the filter comprises an outer layer and an inner layer, wherein the barriers comprise solid portions of either the inner layer or the outer layer.

7. An inflator as in claim 6 wherein the filter is an expanded metal filter, wherein the solid portions are unpunctured portions of the metal filter.

8. An inflator as in claim 1 further comprising at least one fastener for attaching the inflator, the fastener contacting the filter.

9. An inflator as in claim 8 wherein the position of the fastener is selected to apportion the amount of inflation gas that is directed into each chamber of an airbag having a plurality of chambers.

10. An inflator as in claim 9 wherein the fastener comprises a strap that is attached to a stud, the strap encircling the filter.

11. An inflator as in claim 10 wherein the strap is staked to the filter.

12. An inflator as in claim 11 wherein there are two straps that are positioned along the length of the filter, wherein the relative positions of the straps are selected to apportion the amount of inflation gas that is directed into each chamber of a two-chambered airbag.

13. An inflator as in claim 12 wherein the position of the straps may be adjusted relative to the division between the chambers in the airbag.

14. An inflator comprising
  a generant chamber housing a quantity of gas generant;
  a plurality of gas exit holes in the generant chamber, the gas exit holes being equidistant from each other along the length of the chamber; a filter positioned on the exterior of the inflator; and
  a plurality of straps that encircle the filter, wherein the position of the straps is selected to apportion the amount of inflation gas that is directed into each chamber of a two-chambered airbag.

15. An inflator as in claim 14 further comprising a barrier that redirects the gas as it exits the chamber through the gas exit holes.

16. An inflator for inflating an airbag comprising:
  a generant chamber housing a quantity of gas generant;
  a plurality of gas exit holes in the generant chamber, the gas exit holes being positioned along the length of the chamber; and
  a flash-preventing filter positioned outside of the generant chamber that cools inflation gas to prevent hot gas damage to the airbag; and
  one or more barriers that redirect the gas as it exits the chamber through the gas exit holes.

17. An inflator as in claim 16 wherein the filter is positioned on the exterior of the inflator.

18. An inflator as in claim 1 further comprising a porous screen and foil positioned within the generant chamber, wherein the porous screen prevents the gas generant from blocking one or more of the gas exit holes.

* * * * *